(12) United States Patent
Shiina et al.

(10) Patent No.: US 10,801,996 B2
(45) Date of Patent: Oct. 13, 2020

(54) INSPECTION SYSTEM

(71) Applicant: IHI CORPORATION, Tokyo (JP)

(72) Inventors: Eisuke Shiina, Tokyo (JP); Toshiaki Hamano, Tokyo (JP); Takuya Shimomura, Tokyo (JP)

(73) Assignee: IHI CORPORATION, Tokyo (JP)

( * ) Notice: Subject to any disclaimer, the term of this patent is extended or adjusted under 35 U.S.C. 154(b) by 371 days.

(21) Appl. No.: 15/134,686

(22) Filed: Apr. 21, 2016

(65) Prior Publication Data

US 2016/0231284 A1 Aug. 11, 2016

Related U.S. Application Data

(63) Continuation of application No. PCT/JP2014/070840, filed on Aug. 7, 2014.

(30) Foreign Application Priority Data

Nov. 15, 2013 (JP) ................. 2013-237274

(51) Int. Cl.
*G01B 17/00* (2006.01)
*G01N 29/04* (2006.01)
*G01B 11/00* (2006.01)

(52) U.S. Cl.
CPC ......... *G01N 29/043* (2013.01); *G01B 11/002* (2013.01); *G01B 17/00* (2013.01); *F16L 2201/30* (2013.01); *G01N 2291/2634* (2013.01)

(58) Field of Classification Search
CPC ......... G01N 29/043; G01N 2291/2634; G01B 11/002; G01B 17/00; F16L 2201/30
See application file for complete search history.

(56) References Cited

U.S. PATENT DOCUMENTS

| 5,426,978 | A | * | 6/1995 | Imai | ........................ | G01B 17/00 |
| | | | | | | 367/99 |
| 6,009,755 | A | * | 1/2000 | Manome | ............ | G01N 29/0609 |
| | | | | | | 73/602 |
| 6,641,535 | B2 | | 11/2003 | Buschke et al. | | |
| 6,989,123 | B2 | * | 1/2006 | Lee | ...................... | B01J 13/0091 |
| | | | | | | 264/212 |
| 8,061,615 | B2 | | 11/2011 | Yada | | |
| 2006/0184013 | A1 | | 8/2006 | Emanuel et al. | | |
| 2007/0069026 | A1 | * | 3/2007 | Aoyama | .................. | G06K 7/14 |
| | | | | | | 235/462.09 |

(Continued)

FOREIGN PATENT DOCUMENTS

| CN | 102859317 A | 1/2013 |
| EP | 0060952 B1 | 1/1988 |

(Continued)

*Primary Examiner* — John E Breene
*Assistant Examiner* — Eyob Hagos
(74) *Attorney, Agent, or Firm* — Volpe and Koenig, P.C.

(57) ABSTRACT

An inspection system includes: a sheet material that is attached to a surface of a pipe and has two-dimensional patterns drawn thereon that are arranged on the pipe and indicate positions on the pipe; a reader that is mounted to an ultrasonic probe and reads the two-dimensional patterns; and a calculation unit that acquires position data on the pipe based on the two-dimensional patterns read by the reader. The inspection system associates the position data with a flaw detection result obtained from a detection result based on the ultrasonic probe.

7 Claims, 6 Drawing Sheets

(56) References Cited

U.S. PATENT DOCUMENTS

| | | | |
|---|---|---|---|
| 2007/0071320 | A1 | 3/2007 | Yada |
| 2009/0105967 | A1* | 4/2009 | Hatanaka ............ G01N 29/0618 702/39 |
| 2009/0235749 | A1* | 9/2009 | Ehara .................... G01N 29/07 73/622 |
| 2013/0028478 | A1 | 1/2013 | St-Pierre et al. |
| 2013/0104659 | A1 | 5/2013 | Parker et al. |

FOREIGN PATENT DOCUMENTS

| | | | |
|---|---|---|---|
| JP | 06-018247 A | | 1/1994 |
| JP | 06018247 A | * | 1/1994 |
| JP | H0618248 B2 | * | 3/1994 |
| JP | 08-245059 A | | 9/1996 |
| JP | 2001-349878 A | | 12/2001 |
| JP | 2004-001153 A | | 1/2004 |
| JP | 2004-340863 A | | 12/2004 |
| JP | 2005-083984 A | | 3/2005 |
| JP | 2006-268392 A | | 10/2006 |
| JP | 2007-094584 A | | 4/2007 |
| JP | 2007-312009 A | | 11/2007 |
| JP | 2010096520 A | * | 4/2010 |
| JP | 2010-160056 A | | 7/2010 |
| KR | 10-2007-0032919 A | | 3/2007 |
| KR | 101266083 B1 | | 5/2013 |

* cited by examiner

INSPECTION SYSTEM

This application is a Continuation of International Application No. PCT/JP2014/070840, filed on Aug. 7, 2014, claiming priority based on Japanese Patent Application No. 2013-237274, filed on Nov. 15, 2013, the content of which are incorporated herein by reference in their entirety.

TECHNICAL FIELD

Embodiments described herein relates to an inspection system.

BACKGROUND ART

Japanese Patent Application No. 2001-349878 discloses an ultrasonic probe capable of correctly acquiring position data on a test object. The ultrasonic probe includes a vibrator that transmits and receives an ultrasonic wave to and from the test object, an optical position detector that includes an optical sensor that reads a pattern of a surface of the test object that faces the optical sensor at a predetermined cycle and detects a current position of the ultrasonic probe on the test object based on the amount of movement from the same pattern read at an immediately previous cycle with reference to a pattern read at an arbitrary cycle by the optical sensor, and a housing that accommodates the vibrator and the optical position detector.

CITATION LIST

Patent Document

[Patent Document 1] Japanese Unexamined Patent Application, First Publication No. 2001-349878

SUMMARY

Technical Problem

In the related art technique, there is no problem when the ultrasonic probe provided with the optical sensor is scanning a test object such as a pipe to continuously acquire position data, but once the ultrasonic probe is detached from the test object, the total movement distance from reference coordinates (the origin) is not easily detected, and thus, even though the ultrasonic probe returns to the test object, it is difficult to acquire correct position data on the test object.

In order to solve the above problem, an object of the disclosure is to provide a technique capable of acquiring, even in a case where the ultrasonic probe becomes detached from the pipe and then returns to the pipe, correct position data on the pipe, and associating the position data with a flaw detection result of the pipe obtained from a detection result based on the ultrasonic probe.

According to a first aspect of the disclosure, an inspection system is provided that includes an ultrasonic probe that is freely moved on a pipe, and irradiates the pipe with an ultrasonic wave to detect a reflected wave, and a calculation unit that executes arithmetic processing based on the detection result based on the ultrasonic probe to acquire a flaw detection result of the pipe, the inspection system including: a sheet material attached to a surface of the pipe, and has two-dimensional patterns drawn thereon that are arranged on the pipe and indicate positions on the pipe; and a reader mounted to the ultrasonic probe and reads the two-dimensional patterns, in which the calculation unit acquires position data on the pipe based on the two-dimensional patterns read by the reader, and associates the position data with the flaw detection result obtained from the detection result based on the ultrasonic probe.

According to a second aspect of the disclosure, the inspection system according to the first aspect of the disclosure further includes a movement amount sensor attached to the ultrasonic probe to detect the movement amount of the ultrasonic probe on the pipe, and the calculation unit acquires position data on the pipe, of the space between two adjacent two-dimensional patterns in a movement direction of the ultrasonic probe based on the movement amount of the ultrasonic probe detected by the movement amount sensor, and associates the position data with the flaw detection result.

According to a third aspect of the disclosure, in the inspection system according to the first aspect of the disclosure, the two-dimensional patterns arranged in a circumferential direction of the pipe are drawn on the sheet material; the inspection system further includes a movement amount sensor attached to the ultrasonic probe to detect the movement amount of the ultrasonic probe on the pipe in an axial direction; the calculation unit acquires position data on the pipe in a circumferential direction based on the two-dimensional patterns read by the reader, acquires position data on the pipe in the axial direction based on the movement amount of the ultrasonic probe detected by the movement amount sensor, and associates the position data on the pipe in the circumferential direction and the axial direction with the flaw detection result.

According to a fourth aspect of the disclosure, in the inspection system according to any one of the first to third aspects of the disclosure, the sheet material is formed of a semitransparent film.

According to a fifth aspect of the disclosure, in the inspection system according to any one of the first to fourth aspects of the disclosure, the two-dimensional patterns are QR codes (registered trademark).

According to a sixth aspect of the disclosure, there is provided a position detection method for detecting position data of a probe with respect to a sheet material on which a plurality of QR codes in which data indicating position data of a test object is encrypted is arranged and printed, the method including: acquiring an identification point of the QR code closest to the center of a captured image of the sheet material captured by an imaging unit that is integrally formed with the probe; acquiring two different identification points included in the QR code including the acquired identification point; confirming whether or not the three identification points are included in one QR code; and acquiring position data of the QR code from the three identification points.

According to a seventh aspect of the disclosure, the position detection method according to the sixth aspect of the disclosure further includes calculating an inclination of the probe with respect to the sheet material.

According to an eighth aspect of the disclosure, there is provided a sheet material on which a plurality of QR codes in which data indicating position data of a test object is encrypted is arranged and printed, in which the sheet material is waterproof, heat-resistant and has transmitting properties, and is able to be in close contact with the test object.

According to a ninth aspect of the disclosure, in the sheet material according to the eighth aspect of the disclosure, the QR codes are disposed in a zigzag pattern.

According to the disclosure, there is provided an inspection system including a sheet material that is attached to a surface of a pipe, and has two-dimensional patterns drawn thereon that are arranged on the pipe and indicate positions on the pipe; and a reader that is mounted to an ultrasonic probe and reads the two-dimensional patterns. A calculation unit further included in the inspection system acquires position data on the pipe based on the two-dimensional patterns read by the reader, and associates the position data with a flaw detection result obtained from a detection result based on the ultrasonic probe. With such a configuration, even when the ultrasonic probe is detached from the pipe, if the ultrasonic probe returns to the two-dimensional patterns of the sheet material on the pipe, it is possible to acquire correct position data on the pipe. Thus, it is possible to associate the position data with the flaw detection result of the pipe obtained from the detection result based on the ultrasonic probe.

DESCRIPTION OF EMBODIMENTS

First Embodiment

Figure 1:
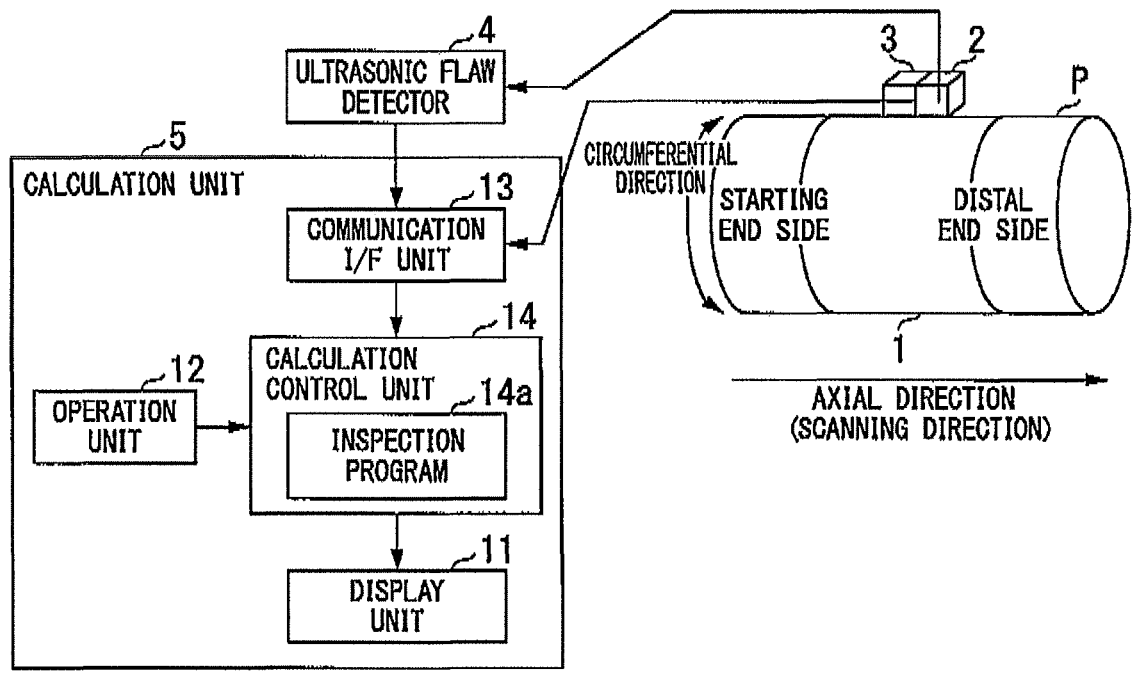
FIG. 1 is a functional block diagram of an inspection system according to a first embodiment of the disclosure.

First, a first embodiment will be described. An inspection system according to the first embodiment is used for inspection of a pipe P which is a test object, and detects cracks or the like generated in a weld line of the pipe P. The inspection system includes a sheet material 1, an ultrasonic probe 2, a reader 3, an ultrasonic flaw detector 4, and a calculation unit 5, as shown in FIG. 1.

Figure 2:
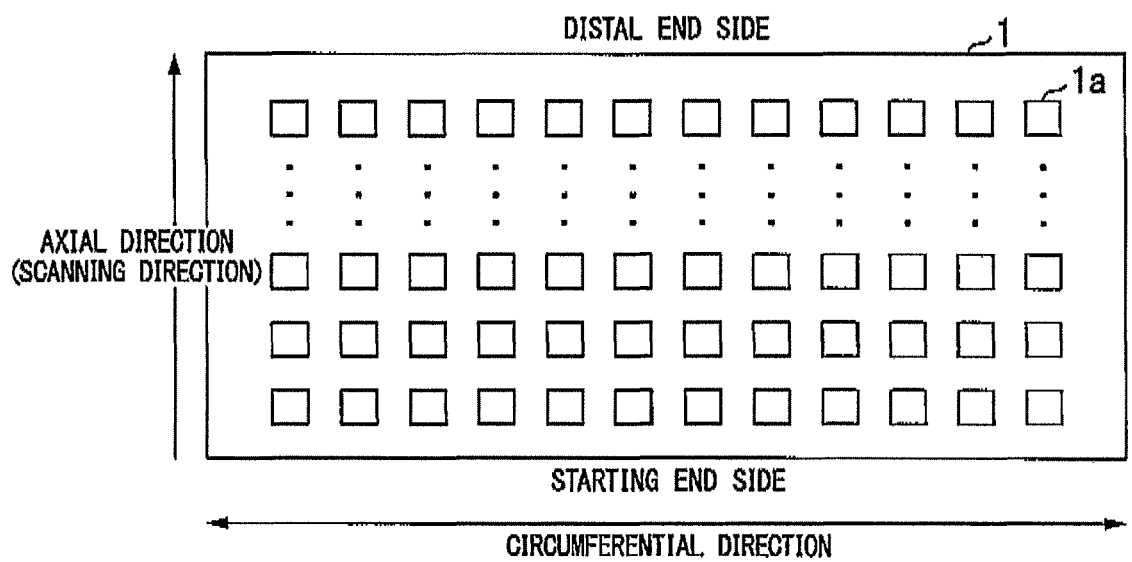
FIG. 2 is a diagram schematically illustrating a surface of a sheet material in the first embodiment of the disclosure.

As shown in FIG. 1, the sheet material 1 is attached to a surface of the pipe P. As shown in FIG. 2, QR codes 1a are drawn on the surface of the sheet material 1 in an axial direction and a circumferential direction on the pipe P. Data indicating a position (coordinates) on the pipe is encrypted in the QR code 1a. The QR codes 1a are disposed at an interval of 10 mm in the axial direction and the circumferential direction of the pipe P, for example. Further, the sheet material 1 is not in direct contact with the surface of the pipe P, but is attached thereto with the surface of the pipe P being coated with glycerin paste (contact medium) that propagates an ultrasonic wave. In this way, since the sheet material 1 is attached through the glycerin paste coated on the pipe P, the sheet material 1 may come in close contact to the pipe P due to the viscosity of the glycerin paste, and even when irregularities are present on the surface of the pipe P, it is possible to attach the sheet material 1 to be flat.

Here, instead of attaching the sheet material 1 on the surface of the pipe P through the contact medium, the sheet material 1 of a gel type may be directly attached to the surface of the pipe P. If the contact medium is not used and the gel type sheet material 1 is used, excess contact medium is prevented from being leaked from an attachment position of the sheet material 1. For the same purpose, a self-adhesive sheet coated with an adhesive material on a rear surface thereof may be used.

Further, the attachment position of the sheet material 1 may be present on a surface different from the surface of the pipe P that is scanned by the ultrasonic probe 2 (which will be described later).

In addition, the QR code 1a provided on the surface of the sheet material 1 may be drawn using a reflector having high reflectance.

Further, coating may be performed on a printing surface of the QR code 1a using a laminate, transparent ink (varnish), or the like.

Normally, the QR code 1a is drawn in black on the sheet material 1 (white), but the QR code 1a may be drawn in white on the sheet material 1 (black).

The sheet material 1 may employ a semitransparent film (illumination sheet) which is waterproof, heat-resistant and has transmitting properties. It is preferable that the sheet material 1 is appropriately transparent. Thus, when an inspector attaches the sheet material 1 to the test object such as the pipe P, it is possible to easily confirm that the sheet material 1 is uniformly wet with the contact medium without the insertion of air bubbles. This is based on the fact that if the air bubbles are inserted inside of the sheet material 1, the air bubbles do not transmit an ultrasonic wave, and thus, a desired flaw detection result cannot be obtained.

As the semitransparent film, for example, a semitransparent film in which polyester (such as PET) is used as a base material and the intensity of a surface layer thereof is enhanced may be used.

The ultrasonic probe 2 is connected to the ultrasonic flaw detector 4 through a coaxial cable, and is able to move on the pipe P. Further, the ultrasonic probe 2 generates an ultrasonic wave from a distal end, detects a reflected wave of the ultrasonic wave, and outputs the detection result to the ultrasonic flaw detector 4 as a detection signal. For example, the ultrasonic probe 2 scans the surface of the pipe P manually by an inspector, and detects a reflected wave of an ultrasonic wave, indicating cracks or the like of the pipe P.

The reader 3 is an optical reader that is attached to the ultrasonic probe 2 and reads the QR code 1a on the surface of the sheet material 1 mounted to the pipe P. The reader 3 is connected to a communication I/F unit 13 through a signal cable, and outputs an image signal, in which an image of the read QR code 1a is included, to the communication I/F unit 13. For example, the reader 3 includes a light emitting unit that includes a light emitting element such as a light emitting diode (LED), and an imaging unit such as a charge coupled device (CCD) camera, and is mounted on a rear side in a movement direction (scanning direction) of the ultrasonic probe 2. The reader 3 may be integrated with the ultrasonic probe 2 using a single housing. In this embodiment, an example in which one imaging unit is provided is shown, but plural imaging units may be provided. For example, two imaging units may be provided on front and rear sides of the ultrasonic probe 2 with the ultrasonic probe 2 being interposed therebetween.

Further, in this embodiment, the reader 3 includes the light emitting unit that includes the light emitting element such as an LED, but may be a laser oscillator. When the laser oscillator is used, it is possible to increase contrast of a position of the sheet material 1 irradiated with a laser beam where the QR code 1a is drawn and a position where the QR code 1a is not drawn. The imaging unit is not limited to a black-white camera, and may be a color camera.

Further, the ultrasonic probe 2 may be provided in the imaging unit.

In addition, the ultrasonic probe 2 may be provided with a button or a wheel, and may have a mouse function capable of operating a personal computer (which will be described later). As the ultrasonic probe 2 has the mouse function, it is possible to perform an operation such as initiation or termination of the inspection, or data separation.

The ultrasonic flaw detector 4 is connected to the ultrasonic probe 2, and is also connected to the communication I/F unit 13 of the calculation unit 5. The ultrasonic flaw detector 4 supplies power to the ultrasonic probe 2 and the reader 3, performs A/D-conversion on a detection signal input from the ultrasonic probe 2, and outputs the converted signal to the communication I/F unit 13 of the calculation unit 5.

A direction of an arrow in FIG. 1 indicates a signal advancing direction, and is not associated with a direction of the above-described power supply.

Further, the ultrasonic probe 2 may be supplied with power from the ultrasonic flaw detector 4, and the reader 3 may be supplied with power from the communication I/F unit 13.

The connection of the ultrasonic probe 2 and the reader 3 is not limited to a wired connection, and may be wireless connection.

In addition, plural ultrasonic probes 2 may be provided.

Further, the ultrasonic probe 2 may use a phased-array ultrasonic inspection method. In this case, scanning over a wide region may be performed using a single ultrasonic probe 2.

The calculation unit 5 is a desktop or notebook type personal computer connected to the ultrasonic flaw detector 4, for example, and as shown in FIG. 1, includes a display unit 11, an operation unit 12, the communication I/F unit 13, and a calculation control unit 14.

The display unit 11 is a cathode ray tube (CRT) display or a liquid crystal display, and displays various screens under the control of the calculation control unit 14.

The operation unit 12 includes a pointing device such as a mouse, and a keyboard, and outputs an operation instruction received from a user to the calculation control unit 14.

The communication I/F unit 13 performs transmission and reception of various signals with the ultrasonic flaw detector 4 through a communication table under the control of the calculation control unit 14. The communication I/F unit 13 is further connected to the reader 3 through a communication cable, and receives an image signal of the QR code 1a read by the reader 3. The communication I/F unit 13 performs A/D-conversion on the received image signal.

The pointing device such as a mouse of the operation unit 12 may be also used as the ultrasonic probe 2.

The calculation control unit 14 includes a central processing unit (CPU), a read only memory (ROM), a random access memory (RAM), an interface circuit that performs transmission and reception of various signals with units which are electrically connected to each other, and the like. The calculation control unit 14 performs a variety of arithmetic processing based on various calculation control programs stored in the ROM, and also performs communication with the units to control the entire operation of the calculation unit 5.

Although details will be described later, the calculation control unit 14 is operated based on an inspection program 14a which is stored in the ROM, analyzes the QR code 1a read by the reader 3 to acquire position data (absolute coordinates) on the pipe P, and associates the acquired position data on the pipe P with a flaw detection result obtained from the detection result based on the ultrasonic probe 2.

Next, an operation of the inspection system with such a configuration will be described.

In order to detect defects such as cracks, or a thinned portion generated in a test object for which ultrasonic inspection can be performed, the ultrasonic probe 2 scans an inspection portion on the pipe P by an inspector. For example, the ultrasonic probe 2 scans the inspection portion on the pipe P along the axial direction of the pipe P from a starting end of the inspection portion on the pipe P to a distal end thereof by the inspector, and then, returns to the staring end of the inspection portion on the pipe P and performs scanning again in the axial direction from a position which is deviated in the circumferential direction. Further, the inspector repeats the operation with respect to the ultrasonic probe 2, to thereby scan the entirety of the inspection portions on the pipe P using the ultrasonic probe 2.

Here, the ultrasonic probe 2 outputs a detection signal to the ultrasonic flaw detector 4. Further, the reader 3 outputs read image data to the communication I/F unit 13.

When the detection signal from the ultrasonic probe 2 is input, the ultrasonic flaw detector 4 performs processing such as A/D conversion with respect to the signal, and outputs the result to the communication I/F unit 13 of the calculation unit 5.

The communication I/F unit 13 outputs the detection signal from the ultrasonic probe 2 input from the ultrasonic flaw detector 4 to the calculation control unit 14. Further, when the image signal is input from the reader 3, the communication I/F unit 13 performs processing such as A/D conversion with respect to the signal, and outputs the result to the calculation control unit 14.

Figure 4:
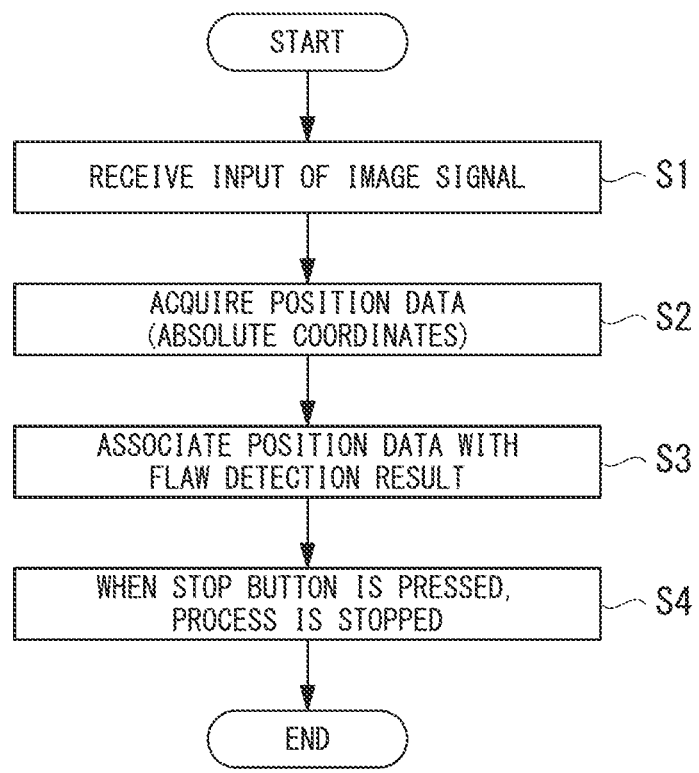
FIG. 4 is a flowchart illustrating an operation of the inspection system according to the first embodiment of the disclosure.

In the calculation unit 5, when the detection signal from the ultrasonic probe 2 is input to the calculation control unit 14 through the ultrasonic flaw detector 4 and the communication I/F unit 13 and the image data is input through the communication I/F unit 13, the calculation control unit 14 performs the following characteristic processes (see FIG. 4) according to the inspection program 14a.

First, in the calculation unit 5, the calculation control unit 14 receives an input of the image signal from the reader 3 mounted to the ultrasonic probe 2 through the communication I/F unit 13 (step S1), and acquires position data (absolute coordinates) on the pipe P based on an image of the QR code 1a included in the image signal (step S2). That is, the calculation control unit 14 analyzes the QR code 1a used on an analysis program for analyzing the QR code 1a included in the inspection program 14a to acquire encrypted position data included in the QR code 1a.

Figure 3:
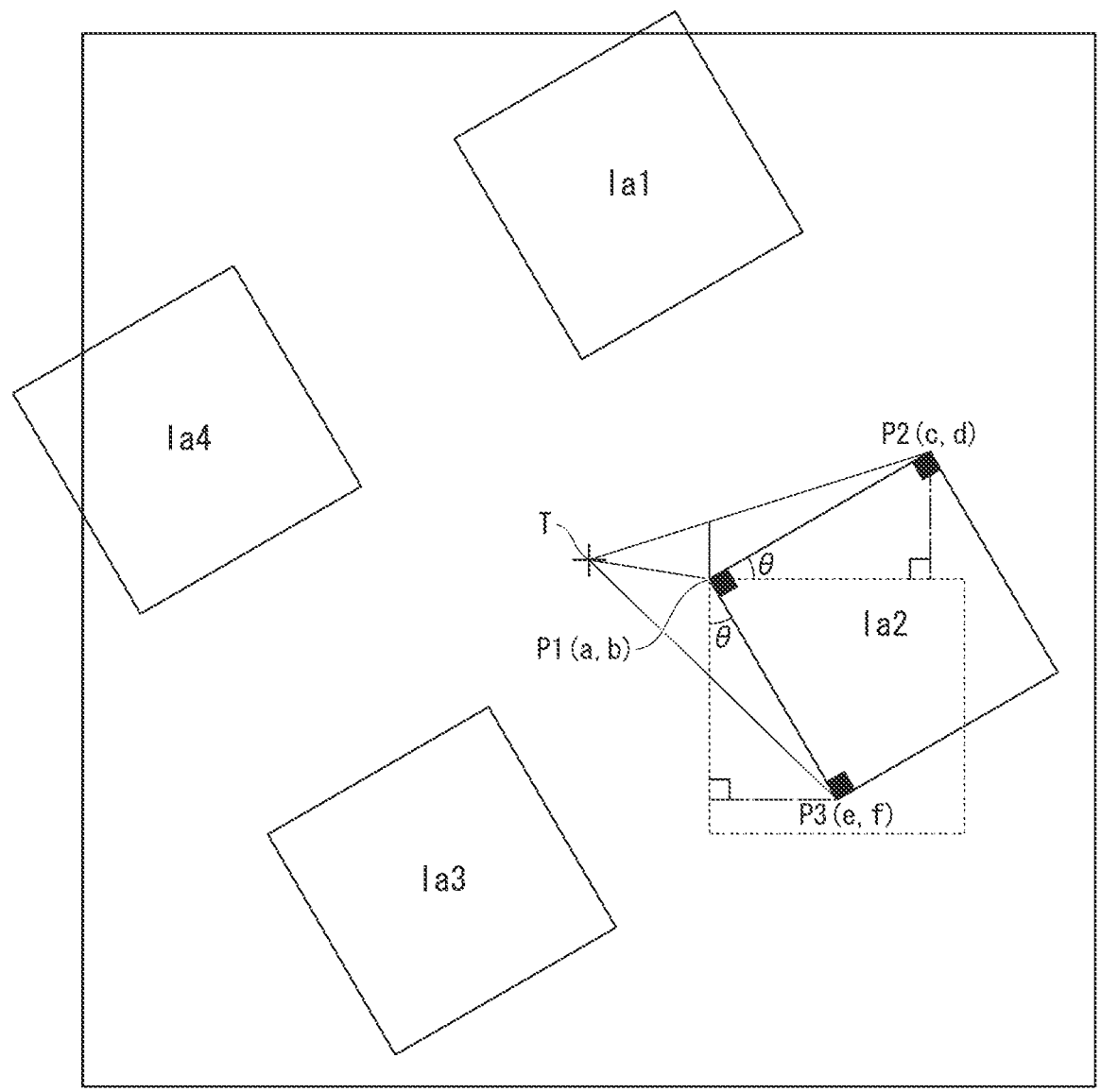
FIG. 3 is a schematic view illustrating an example of a reading principle of position data of a QR code in the first embodiment of the disclosure.

Here, an example of a principle for analyzing the QR code 1a to acquire the position data will be described in detail. FIG. 3 is a schematic view illustrating a reading principle of coordinates of the QR code 1a.

FIG. 3 shows a viewing field of the imaging unit of the reader 3. T represents the center of the viewing field. In this case, four QR codes 1a included in the viewing field are referred to as QR codes 1a1 to 1a4, for ease of description.

First, the calculation control unit 14 searches for identification points of the QR code 1a closest to the center T from the viewing field. Here, the identification points are points indicated as P1 to P3 in FIG. 3, and are used for detection of absolute coordinates of the QR code 1a or an inclination thereof. In this embodiment, the identification points P1 to P3 are provided at three locations with respect to one QR code 1a. In this embodiment, the QR code 1a has a square shape, and the identification points P1 to P3 are provided at three corners among four corners of the square. In FIG. 3, for ease of description, the identification points P1 to P3 are shown only in the QR code 1a2, but in reality, the identification points P1 to P3 are provided in all the QR codes 1a.

In the case of the example shown FIG. 3, since the identification point P1 of the QR code 1a2 is an identification point closest to the center T of the viewing field, the calculation control unit 14 acquires absolute coordinates of the identification point P1. Then, the calculation control unit 14 acquires the absolute coordinates of the QR code 1a2 as follows.

After the absolute coordinates of the identification point P1 are acquired, the calculation control unit 14 acquires the absolute coordinates of the other two identification points (identification points P2 and P3) included in the QR code 1a2, including the identification point P1. Here, for example, when all of the absolute coordinates of the three identification points of the QR code 1a2 cannot be acquired due to covering of foreign substances or the like, the calculation control unit 14 acquires absolute coordinates of the identification point of the QR code 1a1 which is the next closest to the center T.

When the absolute coordinates of the identification point P1 using an x-y coordinate system are (a, b), the absolute coordinates of the identification point P2 are (c, d), and the absolute coordinates of the identification point P3 are (e, f), the absolute coordinates of the center of the QR code 1a are calculated from the absolute coordinates of the three identification points, and the result is acquired as the absolute coordinates of the QR code 1a2.

Then, an inclination $\theta$ of the ultrasonic probe 2 with respect to the QR code 1a2 is calculated using a QR code with no inclination with respect to the viewing field, as indicated by a dotted line shown in FIG. 3. Here, if coordinates of two identification points among the identification points P1 to P3 can be acquired, it is possible to calculate the inclination $\theta$ using a right triangle in which a line segment that connects the two coordinates is a long side.

For example, when the absolute coordinates of the identification point P1 and the identification point P2 are used, if a right triangle in which the identification points P1 and P2 form a long side is used, since lengths of the other two sides of the right triangle are expressed as (c-a) and (d-b), it can be calculated as $\theta=\arctan((d-b)/(c-a))$.

If the inclination $\theta$ of the ultrasonic probe 2 with respect to the QR code 1a2 can be calculated as described above, it is possible to detect an angle formed by the ultrasonic probe 2 and the reader 3 with respect to the sheet material 1. Thus, it is possible to display a propagation position of an ultrasonic beam on the display unit 11 using the position data and the inclination of the ultrasonic probe 2.

Here, the inclination of the QR code 1a can be calculated from two identification points, but since the position (absolute coordinates of the center) of the QR code 1a may be determined by further acquiring the coordinates of the third identification points, three identification points of the QR code 1a are obtained.

Further, when recognizing one QR code 1a, in addition to the acquisition of the identification points P1 to P3, the calculation control unit 14 confirms that one QR code 1a is surrounded by the color (for example, white) of the sheet material 1. Thus, it is possible to prevent erroneous recognition of the QR code 1a.

In the above-described example, the inclination is calculated using only the QR code 1a2, but by calculating the angle $\theta$ using two QR codes 1a of the QR code 1a2 and the QR code 1a1, it is possible to calculate the inclination $\theta$ with higher accuracy.

Accordingly, it is possible to calculate the absolute coordinates of the ultrasonic probe 2 using the absolute coordinates of the QR code 1a and the inclination $\theta$ of the QR code 1a acquired and calculated as described above, and a preset distance from the imaging unit of the reader 3 to the ultrasonic probe 2.

Subsequently, if the detection signal is input from the ultrasonic probe 2 through the ultrasonic flaw detector 4 and the communication I/F unit 13, the calculation control unit 14 executes arithmetic processing based on the detection signal, acquires a flaw detection result of the pipe P, stores the position data and the flaw detection result in association (step S3), and then, creates inspection distribution data based on the position and the flaw detection result (step S4). That is, in step S3, when the ultrasonic probe 2 acquires the detection result, the calculation control unit 14 acquires the absolute coordinates of the QR code 1a at the position where the ultrasonic probe 2 acquires the detection result. The calculation control unit 14 calculates the absolute coordinates of the ultrasonic probe 2 at the position where the detection result is acquired from the absolute coordinates of the QR code 1a acquired by the calculation control unit 14. The calculation control unit 14 stores a combination of the detection result acquired by the ultrasonic probe 2 and the absolute coordinates of the ultrasonic probe 2 at the position where the calculation control unit 14 acquires the detection result.

Further, if the inspector operates the operation unit 12 to press a stop button, the calculation control unit 14 stops the above-described process. When the above-described inspection distribution data is displayed on the display unit 11, each color (for example, red, blue, yellow, or the like) indicating the flaw detection result is displayed as an image mapped for each position on the pipe P.

As described above, the calculation control unit 14 stores the detection result based on the ultrasonic probe 2 and the position data on the pipe P in association. Here, if the detection result and the position data are stored over time, it is possible to display a trajectory of the ultrasonic probe 2.

Further, as a display format of the mapped image, a volume rendering process in consideration of the inclination of the ultrasonic probe 2 and the shape of the test object (for example, the pipe P), in addition to the position of the ultrasonic probe 2, may be performed.

In addition, it is possible to record a free operation of the ultrasonic probe 2, for example, circulating the ultrasonic probe 2 around a defect or thinned portion. In the related art inspection technique using a mechanical scanner, the motion of the ultrasonic probe 2 is a uniform motion in a linear direction, a circumferential direction, or the like, and the direction of an ultrasonic beam is also uniform. However, according to the inspection system according to this embodiment, even though the ultrasonic probe 2 is freely moved by the hand of an inspector, it is possible to automatically acquire the absolute coordinates of a point where a detection result of a reflected wave of the ultrasonic wave is acquired. Thus, restrictions in the scanning direction of the ultrasonic probe 2 are reduced, and thus, it is possible to greatly enhance the convenience of the inspection system.

Further, in inspection at a position of a complicated shape such as a nozzle, it is possible to inform the inspector of the position or angle of the ultrasonic probe 2 in real time, and thus, it is possible to provide a larger amount of information to the inspector. Thus, it is sufficient if the inspector views only the display unit 11 on which the position or angle of the ultrasonic probe 2 is displayed in real time without viewing the pipe P. Accordingly, it can be said that the ultrasonic probe 2 of this embodiment can guide the inspector. Further, by displaying the propagation position of the ultrasonic beam in a three-dimensional manner using the position data and inclination of the ultrasonic probe 2, it is possible to assist the inspector when distinguishing between shape echoes and flaw echoes.

According to this embodiment with such a configuration, the calculation unit 5 acquires the position data on the pipe P based on the QR code 1a read by the reader 3, and associates the position data with the flaw detection result obtained from the detection result based on the ultrasonic probe 2. Thus, even in a case where the ultrasonic probe 2 becomes detached from the pipe P, if the ultrasonic probe 2 is returned onto the QR code 1a of the sheet material 1 on the pipe P, it is possible to acquire correct position data on the pipe P, and to associate the position data with the flaw detection result of the pipe P obtained from the detection result based on the ultrasonic probe 2.

That is, in this embodiment, as shown in FIG. 1, the detection result of the ultrasonic probe 2 is input to the communication I/F unit 13 of the calculation unit 5 through the ultrasonic flaw detector 4, and the image signal from the reader 3 is directly input to the communication I/F unit 13 of the calculation unit 5. The communication I/F unit 13 outputs the detection result of the ultrasonic probe 2 and the image signal of the reader 3 to the calculation control unit 14, and the calculation control unit 14 performs the above-described process to store a combination of the detection result acquired by the ultrasonic probe 2 and the absolute coordinates of the ultrasonic probe 2 acquired by the calculation control unit 14. Such a system is a system in which the inspection function and the position information calculation function are integrated.

Figure 9:
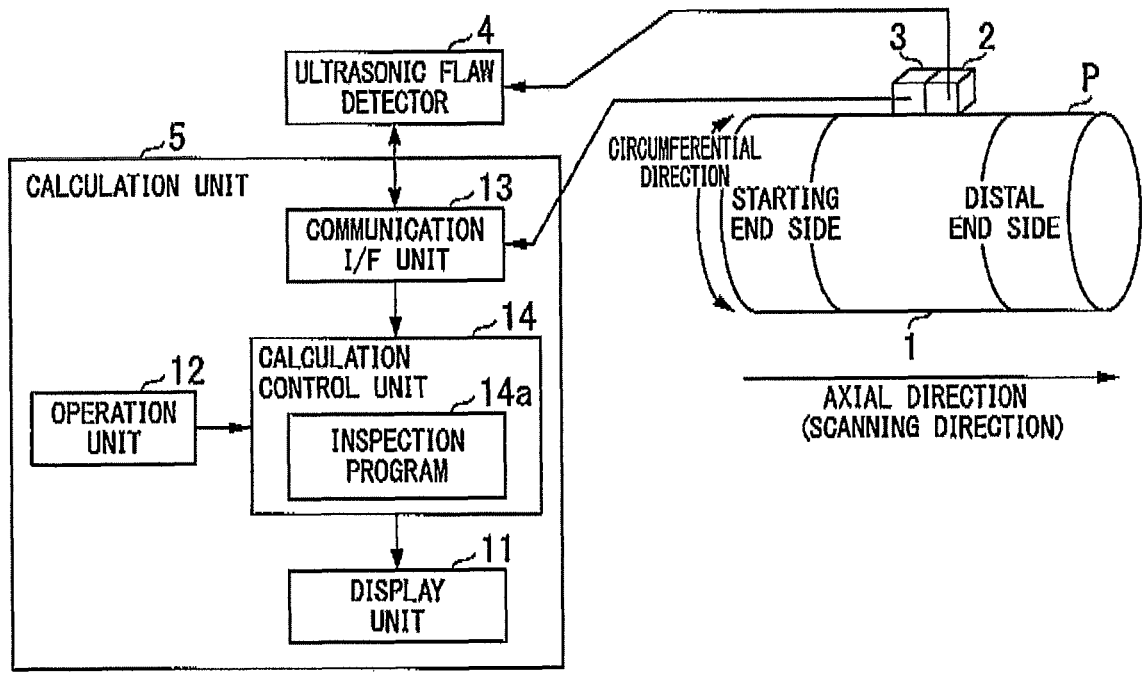
FIG. 9 is a functional block diagram illustrating an inspection system according to a modification example of the first embodiment of the disclosure.

Here, as shown in FIG. 9, the detection result of the ultrasonic probe 2 may be input to the ultrasonic flaw detector 4, and the image signal from the reader 3 may be directly input to the communication I/F unit 13 of the calculation unit 5. Further, the image signal that is subjected to processing such as A/D conversion in the communication I/F unit 13 may be output to the calculation control unit 14, and the absolute coordinates of the ultrasonic probe 2 may be acquired from the image signal in the calculation control unit 14. Further, the absolute coordinates may be output to the ultrasonic flaw detector 4 through the communication I/F unit 13. In this case, in the ultrasonic flaw detector 4, a combination of the detection result acquired by the ultrasonic probe 2 and the absolute coordinates of the ultrasonic probe 2 acquired by the calculation control unit 14 may be stored.

In the system shown in FIG. 9, the inspection function performed by the ultrasonic probe 2 of this embodiment may be replaced with a known general-purpose inspection device. Thus, by combining the known general-purpose inspection function and the acquisition function of the absolute coordinates using the QR code 1a disclosed in this embodiment, it is possible to obtain the same effects as in this embodiment. In this case, the detection result acquired by the ultrasonic probe 2 combined in the ultrasonic flaw detector 4 and the absolute coordinates of the ultrasonic probe 2 acquired in the calculation control unit 14 may be displayed on the display unit 11 of the calculation unit 5, similar to the above-described embodiment. In this case, as shown in FIG. 9, bidirectional communication is performed between the ultrasonic flaw detector 4 and the communication I/F unit 13.

Second Embodiment

Next, an inspection system according to a second embodiment will be described.

Figure 5:
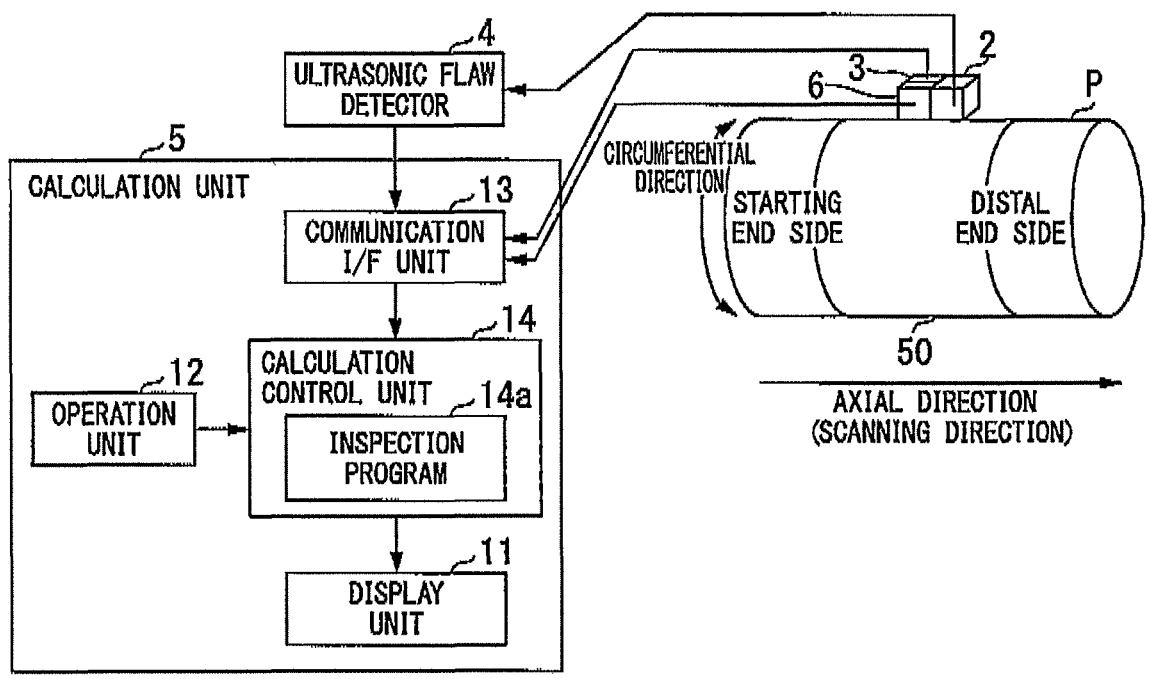
FIG. 5 is a functional block diagram illustrating an inspection system according to a second embodiment of the disclosure.

The inspection system according to the second embodiment is different from the first embodiment in the following points. That is, as shown in FIG. 5, the inspection system according to this embodiment is different from the first embodiment in that a new movement amount sensor 6 is provided and arrangement of QR codes 50a drawn in a sheet material 50 is changed. Other components are the same as in the first embodiment. Accordingly, in the second embodiment, with respect to the same components as in the first embodiment, description thereof will not be repeated.

The movement amount sensor 6 is an optical sensor that is mounted to the ultrasonic probe 2 and detects a movement amount of the ultrasonic probe 2 on the pipe P in the axial direction. The movement amount sensor 6 is connected to the communication I/F unit 13 of the calculation unit 5 through a signal cable, and outputs a movement amount signal indicating the movement amount of the ultrasonic probe 2 to the communication I/F unit 13. For example, the movement amount sensor 6 includes a sensor for an optical mouse, and is mounted to be adjacent to the reader 3 on the rear side of the ultrasonic probe 2 in the movement direction (scanning direction). The movement amount sensor 6 may be integrated with the ultrasonic probe 2 and the reader 3 by a single housing.

Similar to the first embodiment, an arrow direction shown in FIG. 5 displays a signal advancing direction.

Further, power may be supplied to the ultrasonic probe 2 from the ultrasonic flaw detector 4, and power may be supplied to the reader 3 and the movement amount sensor 6 from the communication I/F unit 13. Alternatively, the ultrasonic flaw detector 4 may supply power to the ultrasonic probe 2, the reader 3, and the movement amount sensor 6.

Figure 6:
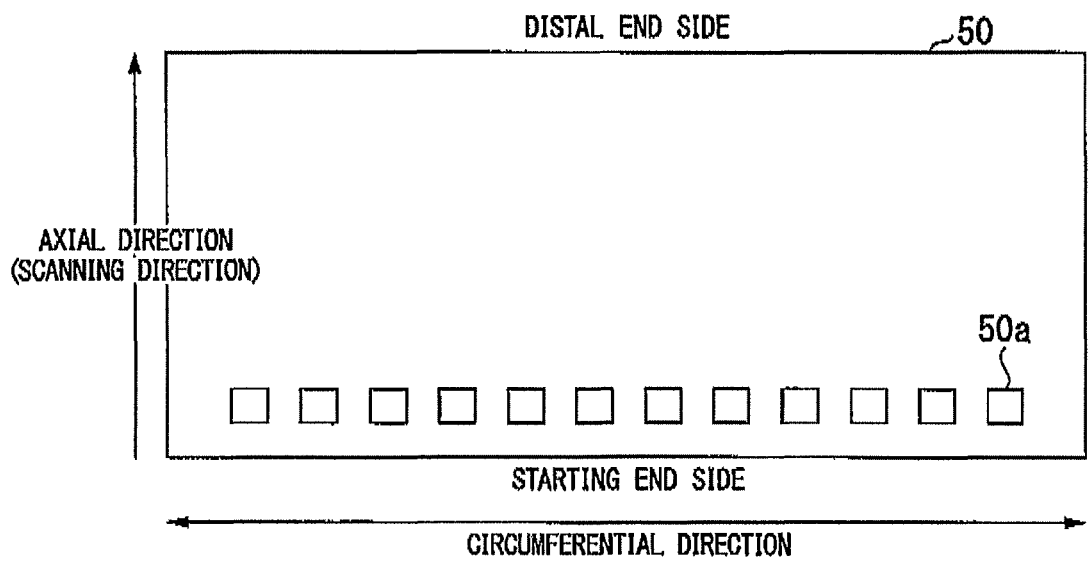
FIG. 6 is a schematic view illustrating a surface of a sheet material in the second embodiment of the disclosure.

As shown in FIG. 6, the QR codes 50a are arranged at an interval of 10 mm in the circumferential direction of the pipe P on a starting end side of the sheet material 50.

Next, an operation of the inspection system with such a configuration will be described.

In order to detect a defect such as a crack, or a thinned portion generated in parallel with a weld line of the pipe P (in the circumferential direction of the pipe P), the ultrasonic probe 2 scans an inspection portion on the pipe P by an inspector. For example, the ultrasonic probe 2 scans the inspection portion on the pipe P along the axial direction of the pipe P from a starting end of the inspection portion on the pipe P to a distal end thereof by the inspector, and then, returns to the staring end of the inspection portion on the pipe P and performs scanning again in the axial direction from a position which is deviated in the circumferential direction. Further, the inspector repeats the operation with respect to the ultrasonic probe 2, to thereby scan the entirety of the inspection portions on the pipe P using the ultrasonic probe 2.

Here, the ultrasonic probe 2 output a detection signal to the ultrasonic flaw detector 4. Further, the reader 3 outputs read image data to the communication I/F unit 13 of the calculation unit 5. Further, the movement amount sensor 6 also outputs a movement amount signal to the communication I/F unit 13 of the calculation unit 5.

If the detection signal from the ultrasonic probe 2 is input, the ultrasonic flaw detector 4 performs processing such as A/D conversion with respect to the signal and outputs the result to the communication I/F unit 13 of the calculation unit 5.

The communication I/F unit 13 outputs the detection signal from the ultrasonic probe 2 input from the ultrasonic flaw detector 4 to the calculation control unit 14. Further, if an image signal from the reader 3 and the movement amount signal from the movement amount sensor 6 are input, the communication I/F unit 13 performs processing such as A/D conversion with respect to these signals, and outputs the result to the calculation control unit 14.

Figure 7:
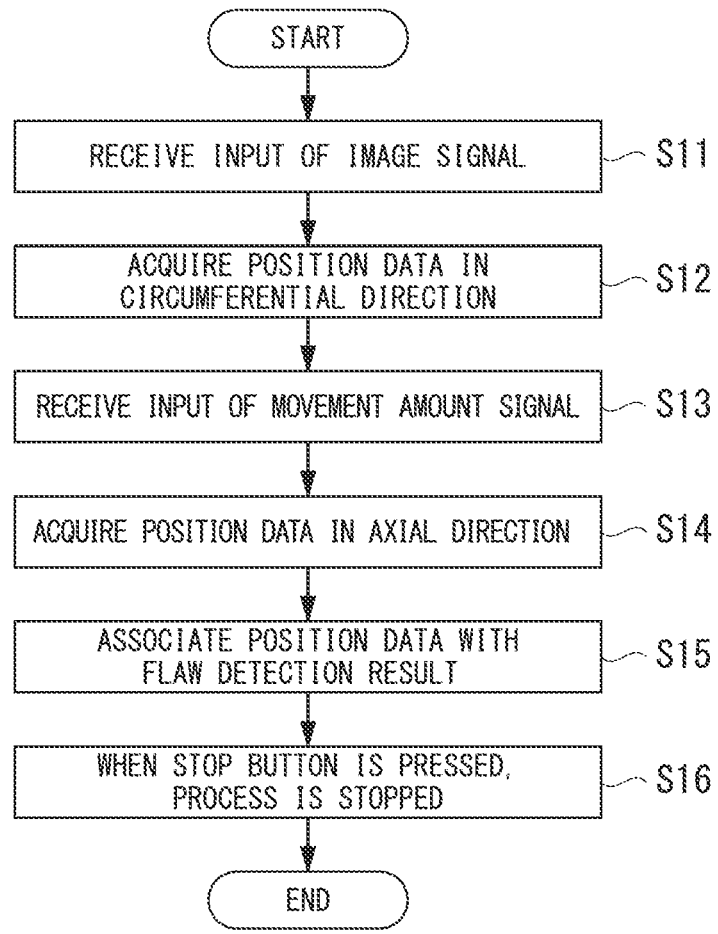
FIG. 7 is a flowchart illustrating an operation of the inspection system according to the second embodiment of the disclosure.

In the calculation unit 5, if the detection signal from the ultrasonic probe 2 is input to the calculation control unit 14 through the ultrasonic flaw detector 4 and the communication I/F unit 13, and the image signal from the reader 3 and the movement amount signal from the movement amount sensor 6 are input to the calculation control unit 14 through the communication I/F unit 13, the following characteristic processes (see FIG. 7) are executed according to the inspection program 14a.

First, in the calculation unit 5, the image signal is input to the calculation control unit 14 from the reader 3 mounted to the ultrasonic probe 2 through the communication I/F unit 13 (step S11), and the calculation control unit 14 acquires position data (absolute coordinates of the pipe P in the circumferential direction) on the pipe P in the circumferential direction based on an image of the QR code 50a included in the image signal (step S12). That is, the calculation control unit 14 analyzes the QR code 50a based on an analysis program for analyzing the QR code 50a included in the inspection program 14a to acquire encrypted position data (absolute coordinates) in the circumferential direction of the pipe P, included in the QR code 50a.

Subsequently, the movement amount signal is input to the calculation control unit 14 from the movement amount sensor 6 mounted to the ultrasonic probe 2 through the communication I/F unit 13 (step S13), and the calculation control unit 14 acquires the position data (absolute coordinates of the pipe P in the axial direction) on the pipe P based on the movement amount (movement amount of the pipe P in the axial direction of the ultrasonic probe 2) of the ultrasonic probe 2 indicated by the movement signal (step S14). That is, when the ultrasonic probe 2 is moved in the axial direction by the inspector, the calculation control unit 14 acquires the position data (absolute coordinates) on the pipe P in the axial direction based on the movement amount of the ultrasonic probe 2 using the movement.

Subsequently, if the detection signal from the ultrasonic probe 2 is input from the ultrasonic probe 2 through the ultrasonic flaw detector 4 and the communication I/F unit 13, the calculation control unit 14 executes arithmetic processing based on the detection signal, acquires a flaw detection result of the pipe P, stores the position data in the circumferential direction and the axial direction and the flaw detection result in association (step S15), and creates inspection distribution data based on the position data and the flaw detection result (step S16). Further, if the inspector operates the operation unit 12 to press a stop button, the calculation control unit 14 stops the above-described process. When the above-described inspection distribution data is displayed on the display unit 11, each color (for example, red, blue, yellow, or the like) indicating the flaw detection result is displayed as an image mapped for each position of the pipe P.

According to this embodiment with such a configuration, the calculation control unit 14 acquires the position data on the pipe P in the circumferential direction based on the QR code 50a read by the reader 3 through the communication I/F unit 13, and acquires the position data on the pipe P in the axial direction based on the movement amount of the ultrasonic probe 2 detected by the movement amount sensor 6. Thus, the calculation control unit 14 associates the position data on the pipe P in the circumferential direction and the axial direction with the flaw detection result, and even in a case where the ultrasonic probe 2 becomes detached from the pipe P, the following effects are obtained. That is, if the ultrasonic probe 2 returns to the QR code 50a of the sheet material 50 on the pipe P, it is possible to acquire correct position data on the pipe P, and to associate the position data with the flaw detection result of the pipe P obtained from the detection result based on the ultrasonic probe 2.

That is, in this embodiment, as shown in FIG. 5, the detection result of the ultrasonic probe 2 is input to the communication I/F unit 13 of the calculation unit 5 through the ultrasonic flaw detector 4, and the image signal from the reader 3 and the movement amount signal from the movement amount sensor 6 are directly input to the communication I/F unit 13 of the calculation unit 5. The communication I/F unit 13 outputs the detection result from the ultrasonic probe 2, the image signal from the reader 3, and the movement amount signal from the movement amount sensor 6 to the calculation control unit 14, and the calculation control unit 14 performs the above-described process to store the detection result acquired by the ultrasonic probe 2 and the position data (absolute coordinates) of the ultrasonic probe 2 acquired by the calculation control unit 14 in association. In such a system, the inspection function and the position information calculation function are integrated.

Figure 10:
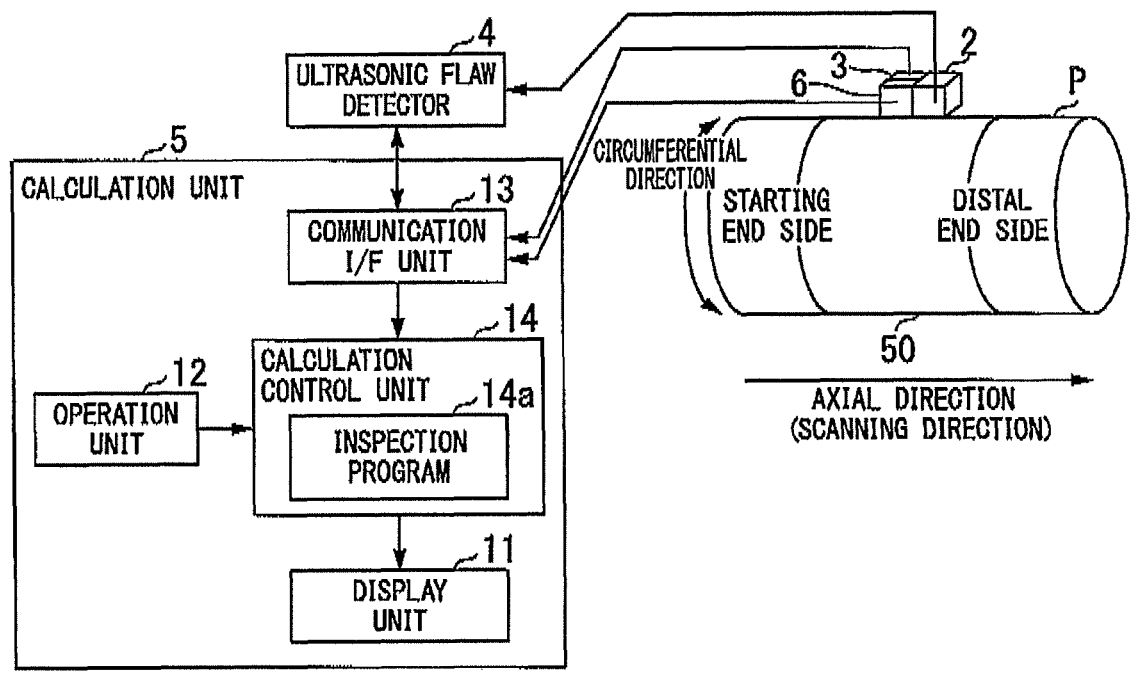
FIG. 10 is a functional block diagram illustrating an inspection system according to a modification example of the second embodiment of the disclosure.

Here, as shown in FIG. 10, the detection result of the ultrasonic probe 2 may be input to the ultrasonic flaw detector 4, the image signal from the reader 3 and the movement amount signal from the movement amount sensor 6 may be directly input to the communication I/F unit 13 of the calculation unit 5. Further, the image signal and the movement amount signal that are subjected to processing such as A/D conversion in the communication I/F unit 13 may be output to the calculation control unit 14, the absolute coordinates of the ultrasonic probe 2 may be acquired from the image signal and the movement amount signal in the calculation control unit 14. Further, the absolute coordinates may be output to the ultrasonic flaw detector 4 through the communication I/F unit 13. In this case, in the ultrasonic flaw detector 4, it is possible to associate the detection result acquired by the ultrasonic probe 2 with the absolute coordinates of the ultrasonic probe 2 acquired by the calculation control unit 14.

In such a system, the inspection function performed by the ultrasonic probe 2 of this embodiment may be replaced with a known general-purpose inspection device. Thus, by combining the known general-purpose inspection function and the calculation function of the absolute coordinates using the QR code 1a disclosed in the embodiment, it is possible to obtain the same effects as in the above-described embodiment. In this case, the detection result acquired by the ultrasonic probe 2 and the absolute coordinates of the ultrasonic probe 2 acquired in the calculation control unit 14, associated in the ultrasonic flaw detector 4, may be displayed on the display unit 11 of the calculation unit 5, similar to the above-described embodiment. In this case, as shown in FIG. 10, bidirectional communication is performed between the ultrasonic flaw detector 4 and the communication I/F unit 13.

Hereinbefore, the embodiments of the disclosure have been described, but the disclosure is not limited to the embodiments, and the following modifications may be considered, for example.

(1) In the inspection system according to the first embodiment, the position data is simply acquired based on the QR codes 1*a*. However, for example, a configuration in which the movement amount sensor 6 is mounted, position data, on the pipe P, of a space between two adjacent QR codes 1*a* (for example, at an interval of 10 mm) in the movement direction (axial direction of the pipe P) of the ultrasonic probe 2 is acquired based on the movement amount of the ultrasonic probe 2 detected by the movement amount sensor 6 as a complementing process, and the position data is associated with the flaw detection result may be used. For example, the calculation control unit 14 of the calculation unit 5 reads a space between two QR codes 1*a* using the reader 3. That is, when the QR code 1*a* is not included in an image captured by the reader 3, the position data on the pipe P between two QR codes 1*a* may be acquired based on the movement amount of the ultrasonic probe 2 detected by the movement amount sensor 6.

(2) In the inspection system according to the second embodiment, the position data is acquired in the circumferential direction of the pipe P based on the QR codes 1*a* arranged at the interval of 10 mm in the circumferential direction of the pipe P, and the position data in the axial direction of the pipe P is acquired by the movement amount sensor 6 that detects the movement amount of the ultrasonic probe 2. However, for example, a configuration in which the position data on the pipe P is acquired based on the QR codes 1*a* arranged at an interval of 100 mm in the circumferential direction of the pipe P, a space between adjacent two QR codes 1*a* (in the circumferential direction of the pipe P) and position data in the axial direction of the pipe P are acquired by the movement amount sensor 6 that detects the movement amount of the ultrasonic probe 2, and the position data is associated with the flaw detection result. For example, the calculation control unit 14 of the calculation unit 5 acquires, by reading one of two QR codes arranged in the circumferential direction using the reader 3, position data on the pipe P based on the one QR code 1*a*, and acquires, when the ultrasonic probe 2 is moved in the circumferential direction from one QR code 1*a*, position data of a space between two QR codes 1*a* in the circumferential direction of the pipe P based on the movement amount detected by the movement amount sensor 6 at that time. In addition, when the ultrasonic probe 2 is moved in the axial direction of the pipe P from the space between two QR codes 1*a*, position data in the axial direction of the pipe P is acquired based on the movement amount detected by the movement amount sensor 6 at that time.

(3) In the inspection system according to the first and second embodiments, the sheet material 1 is made of a semitransparent film, but the disclosure is not limited thereto. The sheet material 1 may employ a thin plastic sheet capable of being flatly attached to the pipe P and allowing propagation of an ultrasonic wave.

Even when an elbow pipe or a U-shaped pipe is connected to the pipe P, by forming the sheet material 1 to match the shape of the elbow pipe or the U-shaped pipe, it is possible to use the sheet material 1 even with respect to a test object having a complicated shape, as well as the linear pipe P. As a method of forming the sheet material 1 to match the shape of the elbow pipe or the U-shaped pipe, the sheet material 1 may be formed like a development view of a solid figure, or may be molded in a three-dimensional manner.

Further, an inspection target to which the present application is applicable is not limited to the pipe, and may be various types of steel buildings such as a pressure vessel or a bridge. Accordingly, the pipe disclosed in the above-described embodiments as the test object is merely an example, and the inspection target is not limited to the pipe.

(4) In the inspection system according to the first and second embodiments, the QR codes 1*a* indicating the positions on the pipe P are drawn on the surface of the sheet material 1, but the disclosure is not limited thereto. For example, instead of the QR codes 1*a*, figures such as triangles or rectangles, two-dimensional patterns such as micro QR codes excluding the normal QR codes 1*a* may be drawn on the surface of the sheet material 1. When the figures such as triangles or rectangles are drawn on the surface of the sheet material 1, the calculation control unit 14 of the calculation unit 5 stores a database in which the figures are associated with position data in advance, and acquires position data based on the database.

Further, codes such as barcodes other than the QR codes 1*a* may be used. In addition, color information may be added to the barcodes or the QR codes 1*a*. As the color information to be added, for example, black and white, gray scale, colors (multicolored printing) may be used.

Instead of the QR codes 1*a*, IC tags in which data indicating a position (coordinates) on the pipe P is encrypted may be used. Alternatively, instead of the QR codes 1*a*, coils may be used.

(5) In the inspection system according to the first and second embodiments, the reader 3 or the movement amount sensor 6 is provided on the rear side of the ultrasonic probe 2 in the movement direction (scanning direction), but may be provided on a front side or a lateral side.

(6) In the inspection system according to the first and second embodiments, the ultrasonic flaw detector 4 and the calculation unit 5 are individual devices, but may be integrated.

(7) In the inspection system according to the first and second embodiments, the inspection system is combined with the ultrasonic probe 2. However, the inspection system may be used for position detection without being combined with the ultrasonic probe 2. Alternatively, the inspection system may be combined with a medical echo device.

(8) The inspection system according to the first and second embodiments is an inspection system of the pipe P using the ultrasonic probe 2. However, the inspection system may be used for measurement of the thickness of a plate, and thus, it is possible to perform detailed measurement of the thickness of the plate. That is, using the inspection system according to the first and second embodiments, it is possible to display a position of the ultrasonic probe 2, an inclination thereof, and a propagation position of an ultrasonic beam on the display unit 11. Accordingly, for example, by digital-processing a display screen of the display unit 11, it is possible to enlarge the display screen to a desired magnification. Thus, with respect to a test object of which a plate thickness is to be measured in detail, it is possible to accurately acquire absolute coordinates of two points where the measurement of the plate thickness can be performed by increasing the magnification as necessary.

(9) In the inspection system according to the first and second embodiments, the QR codes 1a are drawn on the sheet material 1. However, the QR codes may be directly drawn on the pipe P using printing or the like.

(10) In the inspection system according to the first and second embodiments, the sheet material 1 may be formed in a roll shape. Thus, it is possible to apply the inspection system to a large-sized pipe P.

Figure 8:
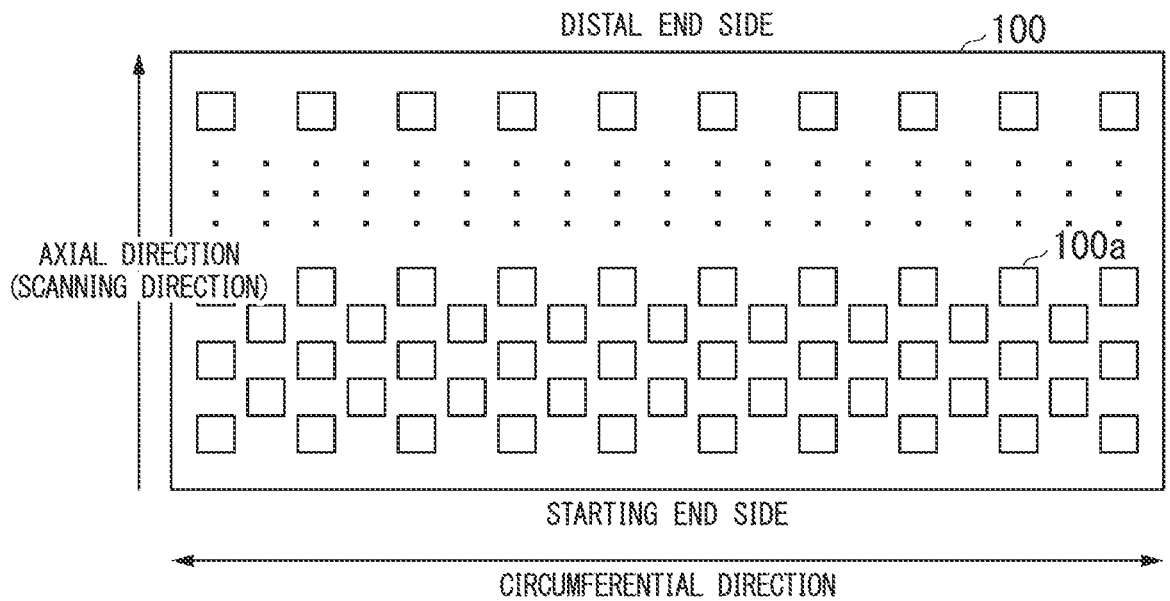
FIG. 8 is a diagram schematically illustrating a surface of a sheet material in another embodiment of the disclosure.

(11) In the inspection system according to the first and second embodiments, as shown in FIG. 8, QR codes 100a drawn on the sheet material 100 may be arranged in the zigzag pattern. By arranging the QR codes 100a in the zigzag pattern, by merely acquiring identification points P1 to P3 included in one QR code 100a without confirming that one QR code 100a is surrounded by the color (for example, white) of the sheet material 100 by the calculation control unit 14 whenever one QR code 100a is recognized, it is possible to prevent erroneous recognition when one QR code 100a is recognized from the identification points P1 to P3. Accordingly, it is possible to make the inspection program 14a lighter and simpler.

INDUSTRIAL APPLICABILITY

Even in a case where the ultrasonic probe becomes detached from the pipe, if the ultrasonic probe returns to the pipe, it is possible to acquire correct position data on the pipe, and to associate the position data with the flaw detection result of the pipe obtained from the detection result based on the ultrasonic probe.

While preferred embodiments of the disclosure have been described and illustrated above, it should be understood that these are exemplary of the disclosure and are not to be considered as limiting. Additions, omissions, substitutions, and other modifications can be made without departing from the scope of the present disclosure. Accordingly, the disclosure is not to be considered as being limited by the foregoing description, and is only limited by the scope of the appended claims.

What is claimed is:

1. An inspection system that improves flaw detection of pipes, the system comprising:
   a sheet material attached to a surface of a pipe, wherein the sheet material has two-dimensional patterns drawn thereon that are arranged on the pipe and indicate positions on the pipe;
   a glycerin paste located between the sheet material and the surface of the pipe;
   an ultrasonic probe that is freely moved on the sheet material and scans an entirety of inspection portions of the pipe, wherein the ultrasonic probe irradiates the pipe with an ultrasonic wave through the sheet material and the glycerin paste to detect a reflected wave;
   a reader that is freely moved on the sheet material and reads the two-dimensional patterns and outputs an image signal, wherein the image signal includes an image of the two-dimensional patterns;
   an ultrasonic flaw detector communicatively coupled to the ultrasonic probe that performs A/D-conversion on the reflected wave detected by the ultrasonic probe to generate detection data, wherein the ultrasonic flaw detector supplies power to the ultrasonic probe and the reader; and
   a processor communicatively coupled to the reader and the ultrasonic flaw detector, wherein the processor:
   determines a flaw detection result of the pipe based on the detection data generated by the ultrasonic flaw detector,
   determines position data on the pipe based on the image signal received from the reader,
   associates the position data with the flaw detection result to generate an associated result, and
   displays the associated result on a display.

2. The inspection system according to claim 1, further comprising:
   a movement amount sensor attached to the ultrasonic probe to detect a movement amount of the ultrasonic probe on the pipe,
   wherein the processor further:
   determines the position data based on a space between two adjacent two-dimensional patterns in a movement direction of the ultrasonic probe based on the movement amount of the ultrasonic probe detected by the movement amount sensor.

3. The inspection system according to claim 1, wherein:
   the two-dimensional patterns arranged in a circumferential direction of the pipe are drawn on the sheet material,
   the inspection system further comprises a movement amount sensor attached to the ultrasonic probe to detect a movement amount of the ultrasonic probe on the pipe in an axial direction, and
   the processor further:
   acquires position data on the pipe in the circumferential direction based on the two-dimensional patterns read by the reader, and
   determines the position data on the pipe in the axial direction based on the movement amount of the ultrasonic probe detected by the movement amount sensor.

4. The inspection system according to claim 1, wherein the sheet material is formed of a semitransparent film.

5. The inspection system according to claim 2, wherein the sheet material is formed of a semitransparent film.

6. The inspection system according to claim 3, wherein the sheet material is formed of a semitransparent film.

7. An inspection system that improves flaw detection of pipes, the system comprising:
   a gel type sheet material attached to a surface of a pipe, wherein the gel type sheet material has two-dimensional patterns drawn thereon that are arranged on the pipe and indicate positions on the pipe;
   an ultrasonic probe that is freely moved on the sheet material and scans an entirety of inspection portions of the pipe, wherein the ultrasonic probe irradiates the pipe with an ultrasonic wave through the sheet material to detect a reflected wave;
   a reader that is freely moved on the sheet material and reads the two-dimensional patterns and outputs an image signal, wherein the image signal includes an image of the two-dimensional patterns;
   an ultrasonic flaw detector communicatively coupled to the ultrasonic probe that performs A/D-conversion on the reflected wave detected by the ultrasonic probe to generate detection data, wherein the ultrasonic flaw detector supplies power to the ultrasonic probe and the reader; and
   a processor communicatively coupled to the reader and the ultrasonic flaw detector, wherein the processor:
   determines a flaw detection result of the pipe based on the detection data generated by the ultrasonic flaw detector, determines position data on the pipe based on the image signal received from the reader,
associates the position data with the flaw detection result to generate an associated result, and
displays the associated result on a display.

* * * * *